(12) United States Patent
Yoon

(10) Patent No.: US 8,955,920 B2
(45) Date of Patent: Feb. 17, 2015

(54) THERMALLY CONDUCTIVE RING FOR A WHEEL ASSEMBLY

(76) Inventor: Sung Kyun Yoon, Iksan-si (KR)

( * ) Notice: Subject to any disclaimer, the term of this patent is extended or adjusted under 35 U.S.C. 154(b) by 567 days.

(21) Appl. No.: 13/319,334

(22) PCT Filed: May 7, 2010

(86) PCT No.: PCT/KR2010/002931
§ 371 (c)(1),
(2), (4) Date: Nov. 7, 2011

(87) PCT Pub. No.: WO2010/128828
PCT Pub. Date: Nov. 11, 2010

(65) Prior Publication Data
US 2012/0067543 A1    Mar. 22, 2012

(30) Foreign Application Priority Data

May 7, 2009    (KR) ......................... 10-2009-0039915

(51) Int. Cl.
*B60B 3/16* (2006.01)
*B60B 3/04* (2006.01)
*F16B 5/02* (2006.01)
*F16B 19/02* (2006.01)
*F16B 43/00* (2006.01)

(52) U.S. Cl.
CPC . *B60B 3/044* (2013.01); *B60B 3/16* (2013.01); *F16B 5/0241* (2013.01); *F16B 19/02* (2013.01); *F16B 43/00* (2013.01)
USPC .................................................. 301/35.627

(58) Field of Classification Search
CPC .......... B60B 3/008; B60B 3/14; B60B 3/145; B60B 3/16; B60B 3/165; B60B 27/0057; B60B 2900/921; B60B 2900/513

USPC ............ 301/6.1, 6.7, 9.1, 10.1, 11.1, 35.621, 301/35.622, 35.623, 35.625, 35.626, 301/35.627, 35.632; 188/17, 18 A, 218 R, 188/218 XL; 384/276, 277, 278, 279, 280, 384/281–289; 403/365, 371, 372

See application file for complete search history.

(56) References Cited

U.S. PATENT DOCUMENTS 5,507,370 A  *  4/1996  White et al. ............... 188/264 G
5,810,504 A  *  9/1998  Rabinovich .................. 403/371

FOREIGN PATENT DOCUMENTS

CN          2779623 Y       5/2006
JP          54-099203   *   7/1979

(Continued)

OTHER PUBLICATIONS

International Search Report for PCT/KR2010/002931 mailed Aug. 13, 2010.

*Primary Examiner* — S. Joseph Morano
*Assistant Examiner* — Jean Charleston
(74) *Attorney, Agent, or Firm* — Revolution IP, PLLC

(57)  ABSTRACT

According to the present invention, a thermally conductive ring for a wheel assembly, which is inserted over a stud bolt that fixes a brake drum or disc of a vehicle to a wheel, is provided with a cylindrical main body having a cutaway portion in the lengthwise direction, and a heat-dissipating portion formed on at least one side of a surface and edge of the main body to increase the surface area. The thermally conductive ring of a wheel assembly facilitates the transfer of heat generated during braking and driving to the wheels and enables heat dissipation, to retain the initial design specifications of the vehicle while reducing the uneven wear of tires and one side brake, and improving cornering and ride quality.

5 Claims, 16 Drawing Sheets

(56) References Cited

FOREIGN PATENT DOCUMENTS

| | | |
|---|---|---|
| JP | 05-278402 | 10/1993 |
| JP | 2003-314601 | 11/2003 |
| JP | 2007-023832 | 2/2007 |
| KR | 20-0374199 | 1/2005 |
| KR | 10-2005-0081140 | 8/2005 |

* cited by examiner

THERMALLY CONDUCTIVE RING FOR A WHEEL ASSEMBLY

RELATED APPLICATIONS

This application is a 371 application of International Application No. PCT/KR2010/002931, filed May 7, 2010, which in turn claims priority from Korean Patent Application No. 10-2009-0039915, filed May 7, 2009, each of which is incorporated herein by reference in its entirety.

TECHNICAL FIELD

The present invention relates to a thermally conductive ring for a wheel assembly, and more particularly, to a thermally conductive ring for a wheel assembly which transfers heat generated from a brake drum to a stud bolt to a wheel.

BACKGROUND ART

Typically, automotive wheel manufacturers have attempted to form the same axle for a center-pilot opening and an axle and to a tire rim bead seat to manufacture a wheel which may be perfectly coupled to the axle in the same axle.

Even if the tire wheel is precisely manufactured as above, the coupling of the tire wheel and the axle of the vehicle is conducted by inserting a plurality of stud bolts installed through hub and drum of axle to a fixing hole of the wheel and then by coupling the stud bolts and nuts. During the foregoing process, the center of the wheel does not conform to the center of the axle due to the difference of diameters of the stud bolts and the fixing hole formed in the tire wheel.

If the vehicle is braked while driving, heat is generated from a friction force between a brake drum or disc and pad. The heat generated therefrom is transferred to stud bolts, brake drum and wheel.

During the heat transfer process, parts have their own thermal expansion coefficient and thus vary the amount of thermal expansion. Such variation in thermal expansion causes change in the coupling and supporting state of the wheel with respect to the axle, and adversely affects the driving and ends in a failure to maintain structural stability ensured at the time of designing a vehicle.

Failure to ensure conformity between the center of the axle and the center of the tire wheel causes a relative movement of the drum and wheel having the stud bolt as a result of great load to the axle by large trucks or buses. Further, a frictional movement between a disc and nut of the tire wheel is caused and the nut is disconnected from the stud bolt or fixed thereto. Accordingly, fastening bolts is performed repeatedly after driving certain distance (approximately 100 km) at the time of ex-mill or of replacing tires.

Japanese Patent Publications nos. 07-228101 and 05-27840 disclose technical configurations to match the axle to the center of the wheel.

A conventional configuration for preventing unfastening of a wheel nut includes a first stud bolt which is inserted into a drum through an internal wheel, a wheel conical ring and flange interposed between the internal wheel and the flange of a hub from an external wheel while a brake drum, external and internal wheels and hub are assembled; a second stud bolt which is inserted into a core on the external wheel of the first stud bolt through a coupling hole of the internal and external wheels; and a wheel nut which is inserted into an external screw of the second stud bolt.

The foregoing configuration includes two members in which the stud bolt is coupled to the nut, and thus structural stability is not ensured. If the first and second bolts are unfastened, the wheel is not firmly fixed, and the thermal expansion issue may not be solved fundamentally.

In particular, each part of an assembly including a brake unit has different degrees of contact to an external device, and thermal parallel is not achieved easily. Accordingly, thermal expansion of the drum, stud bolt and wheel vary by repeated braking, and such variation distorts the wheel assembly.

The distortion of the wheel assembly causes uneven wear, one side brake and worsens steering performance according to driving.

The present applicant has filed application for a ring which prevents distortion of an axle and wheel of a vehicle, and filed application for this invention after continuous research and development.

DISCLOSURE

Technical Problem

The present invention has been made to solve the problems and it is an object of the present invention to provide a thermally conductive ring for a wheel assembly which is inserted into a stud bolt coupling an axel and a wheel to prevent distortion of a center of the axel and a wheel, transfers heat from a brake drum to the wheel to ensure cooling and thermal parallel within short time, and fundamentally prevents a distortion due to variation of thermal expansion.

It is another object of the present invention to provide a thermally conductive ring for a wheel assembly which prevents deformation or damage to a screw of a bolt by a wheel as a result of a reduced axial force of a drum and a wheel, and reduces vibration in a radial direction to thereby reduce vibration while driving.

Technical Solution

In order to achieve the object of the present invention, a thermally conductive ring for a wheel assembly which is inserted into a stud bolt fixing a brake drum or disc to a wheel comprises a main body which is shaped like a cylinder and comprises a cutaway portion in a lengthwise direction; and a heat-dissipating portion which is formed in at least one side of a surface and edge of the main body and increases the surface area.

The heat-dissipating portion comprises projections shaped like a saw tooth, circle or wave formed continuously or uncontinously in an edge of the main body.

The main body comprises a base metal member which is shaped like a cylinder and comprises the cutaway portion, a first thermally conductive layer formed on a surface of the base metal member, an intermediate layer coating a surface of the first thermally conductive layer and a second thermally conductive layer coating a surface of the intermediate layer.

The main body further comprises a base metal member and an auxiliary thermal expansion layer which is coupled to the base metal member and reduces a gap between the stud bolt and the fixing hole of the wheel by the thermal expansion and comprises a larger thermal expansion coefficient than the base metal member.

The base metal member comprises STC steel, the first thermally conductive layer comprises copper or copper alloy, the intermediate layer comprises nickel and the second thermally conductive layer comprises one of gold, titanium, gold alloy, chrome and chrome alloy, and the thermal expansion layer comprises copper, copper alloy, silver, silver alloy, gold, gold alloy, aluminum, aluminum alloy, titanium or titanium alloy.

Advantageous Effect

As described above, a thermally conductive ring for a wheel assembly facilitates a transfer of heat generated during braking and driving to a tire wheel through a brake drum, or a disc and a stud bolt to thereby improve heat dissipation and to fundamentally prevent deformation of the wheel assembly due to variation in thermal expansion among parts. Further, the wheel assembly according to the present invention prevents a brake drum, stud bolt and tire wheel from being overheated, retains the initial design specifications, reduces the uneven wear or tires and one side brake and improves cornering and ride quality.

BEST MODE

Figure 1:
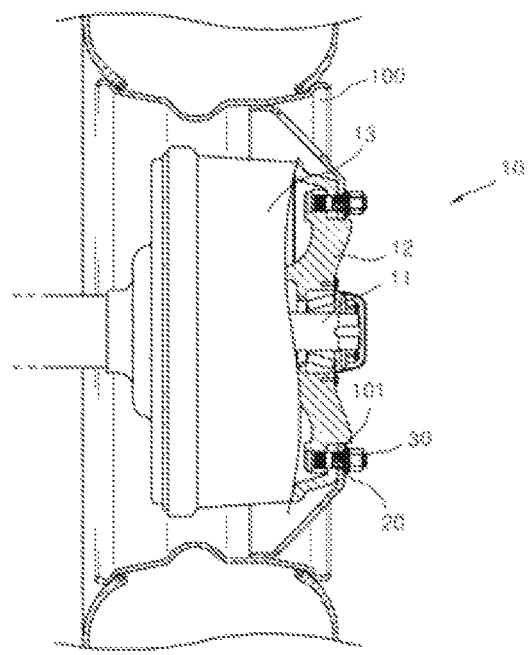
FIG. 1 is a partial cutaway lateral view of a wheel assembly in which a thermally conductive ring is mounted according to the present invention.
Figure 2:
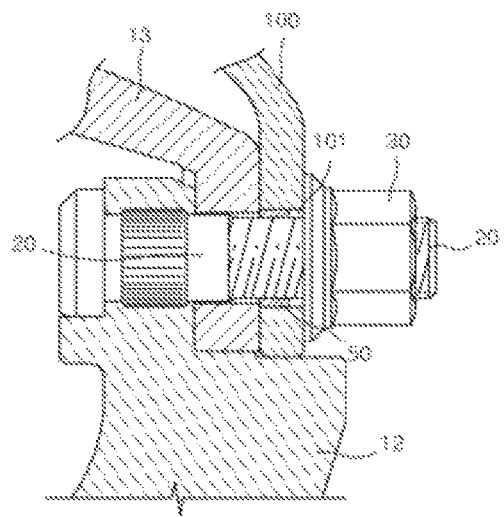
FIG. 2 is an enlarged sectional view of the thermally conductive ring of the wheel assembly according to the present invention.

A thermally conductive ring for a wheel assembly according to the present invention matches a rotating center of an axel to a rotating center of a tire wheel in fixing the tire wheel to the axel by a stud bolt and a nut and facilitates a transfer of heat generated during braking to a rim through the stud bolt to thereby prevent distortion of the wheel assembly and unfastening of nuts to the stud bolts. The thermally conductive ring for a wheel assembly according to an exemplary embodiment is shown in FIGS. 1 and 2.

Referring to drawings, a wheel assembly 10 includes a hub 12 which is installed in an axle 11 and a disc or a brake drum 13 which is used to brake a vehicle and is coupled to the hub 12 and a stud bolt 20 (to be described later). The hub 12 and the brake drum 13 have a plurality of stud bolts 20 passing through the hub 12 and the brake drum 13 and arranged in a circumferential direction centering on the axle 11. The stud bolt 20 has a fixing hole 101 of a tire wheel 100 to be coupled to a nut 30.

A thermally conductive ring 50 is inserted between an external circumferential surface of the stud bolt 20 and the fixing hole 101 of the tire wheel 100 to transfer heat generated during braking or driving from the stud bolt 20 of the brake drum to the tire wheel 100 or from the tire wheel 100 to the brake drum 13 and to correct the center.

Figure 3:
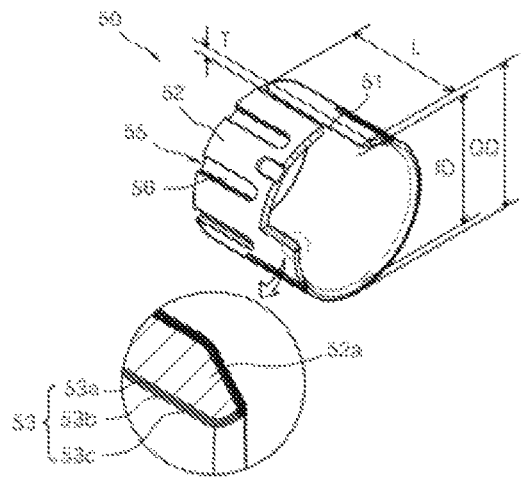
FIGS. 3 to 5 are partial cutaway perspective views of the thermally conductive ring for the wheel assembly according to exemplary embodiments of the present invention.

FIG. 3 illustrates the thermally conductive ring according to an exemplary embodiment of the present invention.

As shown therein, the thermally conductive ring 50 includes a cutaway portion 51 formed in a lengthwise direction, a main body 52 shaped like a cylinder and a heat-dissipating portion 55 formed in an edge of the main body 52.

The main body 52 includes a base metal member 52a which includes the cutaway portion 51 and is shaped like a cylinder. A thermally conductive layer 53 is formed on a surface of the base metal member 52a. The thermal conductive ring 53 may include a first thermal conductive ring 53a formed on a surface of the base metal member 52a, a intermediate layer 53b coating a surface of the first thermally conductive layer 53a and a second thermal conductive ring 53c coating a surface of the intermediate layer 53b. A single thermally conductive layer may be formed in the base metal member 52a and include a more conductive metal than the base metal member 52a.

The base metal member 52a may include a material which is less strong in structure than the stud bolt 20, e.g., STC steel (JIS standard).

The first thermal conductive ring 53a may include copper or copper alloy. The intermediate layer 53b may include nickel. The second thermally conductive layer 53c may include gold or gold alloy. The thermal expansion layer may include one of copper, copper alloy, silver, silver alloy, gold, gold alloy, aluminum, aluminum alloy, titanium, titanium alloy, chrome and chrome alloy. If a single thermally conductive layer is formed on the base metal member 52a, it may include one of gold, gold alloy, silver, silver alloy, copper and copper alloy.

Figure 4:
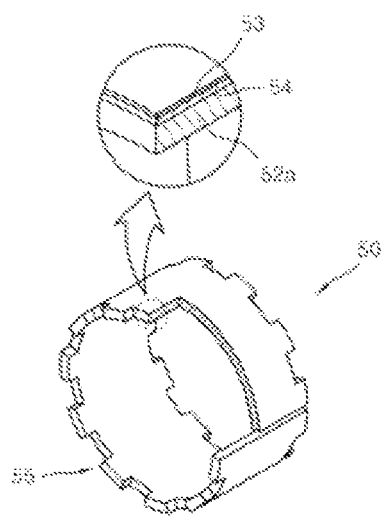
Figure 5:
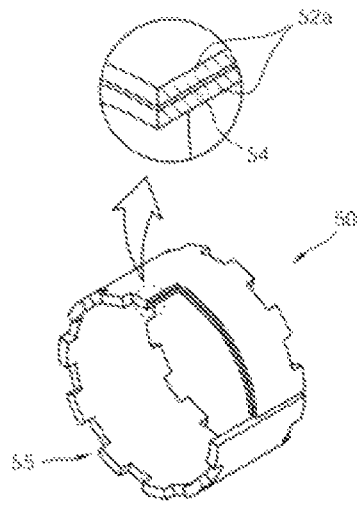
Figure 6:
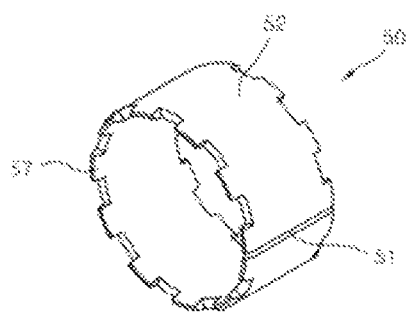
FIGS. 6 to 8 are perspective views of a thermally conductive ring for a wheel assembly according to another exemplary embodiments of the present invention.
Figure 7:
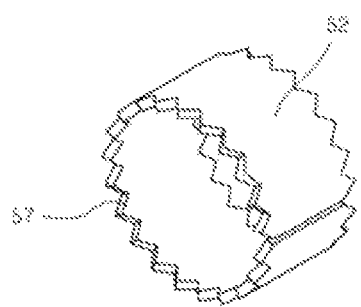
Figure 8:
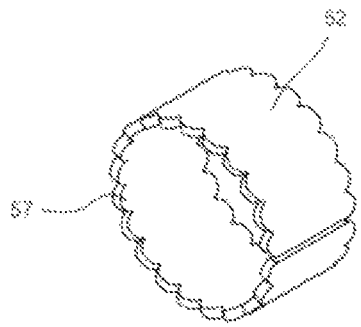

As shown in FIG. 4, the base metal member 52a forming the main body 52 may further include an auxiliary thermal expansion layer 54 which is used to reduce a gap between the stud bolt and the fixing hole 101 of the wheel due to thermal expansion by heat generated during braking or driving, is connected to the base metal member 52a and includes a material having a larger thermal expansion coefficient than the base metal member 52a. As shown in FIG. 5, the auxiliary thermal expansion layer 54 may be provided between the two base metal members 52a. Such coupling structure may prevent the auxiliary thermal expansion layer 54 having a weak property of matter from being damaged by a screw thread of the stud bolt 20. The auxiliary thermal expansion layer 54 may include one of copper, copper alloy, silver, silver alloy, gold, gold alloy, nickel, nickel alloy, titanium, titanium alloy, chrome and chrome alloy.

If the auxiliary thermal expansion layer is formed on a surface of the base metal member 52a, the thermally conductive layer 53 may be formed on a surface of the auxiliary thermal expansion layer 54.

As shown in FIG. 3, the heat-dissipating portion 55 may have an entrance groove 56 formed thereon. The entrance groove 56 may start from an edge and be open to discharge air from inside to the edge. The entrance groove 56 may be alternately formed.

As shown in FIGS. 4 to 8, a plurality of projections 57 is formed in an edge of the main body 52 to form the heat-dissipating portion 55. The projections 57 may be shaped like a saw tooth, circle, wave, continuous semicircular projections, or saw tooth or circular projections formed at a predetermined pitch. The thickness of the projections 57 forming the heat-dissipating portion 55 may be relatively thinner than the main body 52 (refer to FIG. 6).

Figure 9:
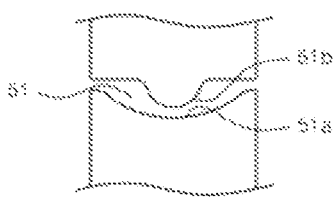
FIGS. 9 to 20 are partial cutaway front views of a cutaway portion according to exemplary embodiments of the present invention.

As shown in FIG. 9, the cutaway portion 51 may include an entrance groove 51a which is formed in an end portion of the main body 52 forming the cutaway portion and has a radius which is ½ of the width, and a projection 51b which is formed in another end portion of the main body 52 and has a smaller radius of curvature than the entrance groove 51a. The projection may be coupled to the entrance groove.

Figure 10:
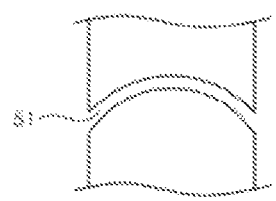
Figure 11:
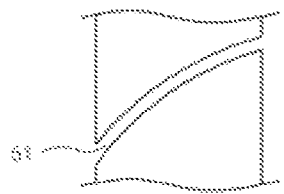

As shown in FIG. 10, the cutaway portion according to another exemplary embodiment may include an entrance groove which is formed in an end portion forming the cutaway portion and has a radius that is ½ of the width, and a projection which is formed in another end portion and has the same radius of curvature as the entrance groove. The projection may be coupled to the entrance groove. As shown in FIG. 11, the cutaway portion 11 may be inclined.

FIGS. 14 to 20 illustrate the cutaway portion according to another exemplary embodiment. As shown therein, the cutaway portion 51 may be formed that a circular projection, a semicircular projection having a predetermined radius of curvature and projections shaped like a saw tooth that are correspond to one another. A circular projection, a semicircular projection having a predetermined radius of curvature and a projection shaped like a saw tooth may be formed in an end portion of the main body, and the groove may be formed in another end portion thereto to be coupled to the projections.

Figure 12:
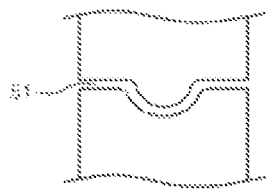
Figure 13:
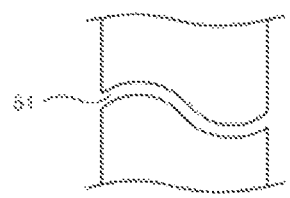
Figure 14:
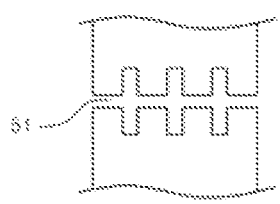
Figure 15:
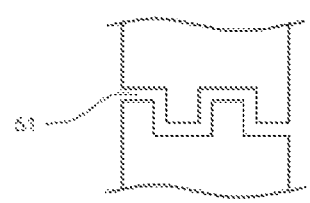
Figure 16:
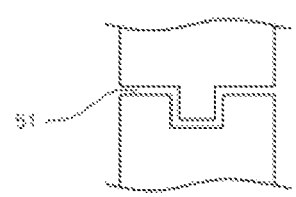
Figure 17:
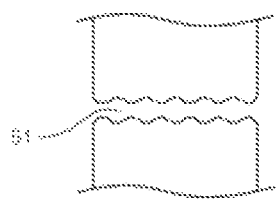
Figure 18:
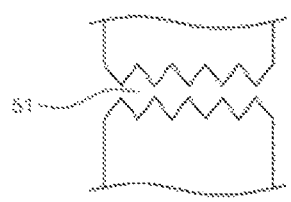
Figure 19:
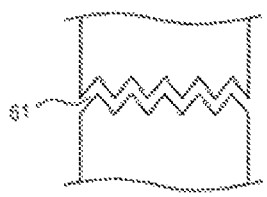
Figure 20:
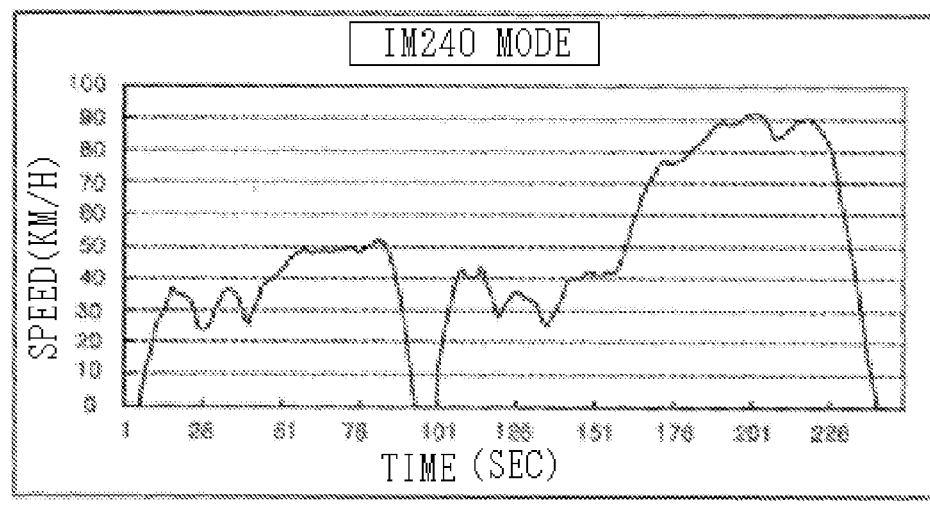

The cutaway portion is not limited to those according to the foregoing exemplary embodiment, and may vary as long as it is a direct or non-direct type (refer to FIGS. 11 and 12).

An internal diameter ID of the thermally conductive ring 50 may be 11 mm to 24 mm and an external diameter OD of the thermally conductive ring 50 may be 12 mm to 28 mm. A width L of the main body 51 in a lengthwise direction may be 4 mm to 20 mm. If the thickness of the center ring 10 is 0.5 mm or less, the center ring 10 is damaged by a shearing force of a screw thread and may not operate as a center ring upon being provided between the screw thread of the stud bolt 20 and an internal circumference of the tire wheel 100. Accordingly, the thickness T of the center ring may be 0.5 mm to 2 mm. In this case, the center ring may not be sheared or damaged by the screw thread of the stud bolt 20.

With the foregoing configuration, an operation of the thermally conductive ring for a wheel assembly according to the present invention will be described.

To separate the wheel 100 from a vehicle and fix the wheel 100 in which the tire is replaced in manufacturing a vehicle or replacing a tire, one or a plurality of thermally conductive rings 50 is inserted into the stud bolt 20 protruding from the hub 12 or the brake drum 13.

The fixing hole 101 of the tire wheel 100 having the tire mounted therein is inserted into the stud bolt 20. The stud bolt 20 is then coupled to the but 30, and the tire wheel 100 having the tire mounted therein is mounted in the axle as shown in FIGS. 1 and 2. The thermally conductive rings 50 which are inserted into the stud bolt 20 should not protrude from an external part of the fixing hole 101 of the tire wheel 100. Such coupling is installed between the stud bolt and the internal circumference of the fixing hole 101 of the tire wheel 100 to thereby reduce a gap therebetween. Accordingly, a relative movement of the tire wheel 100 to the stud bolt 20 by a shearing force (surface pressure) between the drum and the tire wheel 100 as a great load is applied to the axle such as large trucks may be prevented. As the auxiliary thermal expansion layer 54 is formed in the main body 51, the gap between the stud bolt 20 and the internal circumference of the fixing hole 101 may be reduced by the expansion of the thermal expansion layer 54 and the main body 52. As described above, the relative movement of the tire wheel by the surface pressure may be prevented.

The thermally conductive ring 50 inserted into the stud bolt 20 and the fixing hole 101 of the tire wheel has the thermally conductive layer 53 formed in an external circumference thereof to facilitate heat transfer between the stud bolt 20 and the tire wheel 100. Thus, the heat transfer from the stud bolt 20 to the tire wheel 20 is facilitated within short time. As the heat-dissipating portion 55 is formed in the thermally conductive ring 50, heat generated during braking may be dissipated within short time. As the heat dissipation of the wheel assembly of a vehicle is facilitated, the distortion of the brake assembly and the wheel assembly due to variation of thermal expansion among parts may be prevented.

The prevention of distortion of the wheel assembly and the correction of the center of the tire wheel and axle may improve fuel efficiency and driving performance of a vehicle.

Such effect may be demonstrated clearly through the following test result.

Test 1

This test was conducted at Aju Motor College to measure fuel efficiency and exhaust of a vehicle including the thermally conductive ring according to the present invention and a vehicle excluding the thermally conductive ring.

Test equipment includes a chassis dynamometer and exhaust gravimetric analyzer. The test vehicle is NF Sonata manufactured by Hyundai Motor Company (auto transmission equipped, gasoline engine 2,000 cc, year 2007 model, and 60,000 Km driven). The test was commenced on Nov. 20, 2008 and continued until Nov. 21, 2008, and the test driving was conducted for 400 km.

Figure 21:
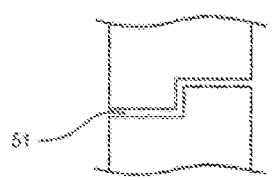
FIG. 21 is a graph which illustrates a driving mode for testing fuel efficiency according to the present invention.

The driving mode was based on the mode set by the United States by statistically extracting most average driving pattern out of downtown driving patterns as shown in FIG. 21.

TABLE 1

| Mounting/unmounting | | Measured item | | | |
| --- | --- | --- | --- | --- | --- |
| | | Exhaust (g/km) | | | Fuel efficiency |
| | | HC | CO | Nox | (km/L) |
| Before mounting thermally conductive ring | #1 | 0.002 | 0.028 | 0.002 | 9.649 |
| | #2 | 0.003 | 0.031 | 0.002 | 9.765 |
| | #3 | 0.004 | 0.015 | 0.002 | 9.553 |
| | average | 0.003 | 0.025 | 0.002 | 9.66 |
| After mounting thermally conductive ring | #1 | 0.004 | 0.039 | 0.001 | 9.868 |
| | #2 | 0.004 | 0.036 | 0.001 | 10.162 |
| | #3 | 0.005 | 0.015 | 0.002 | 9.991 |
| | average | 0.004 | 0.030 | 0.001 | 10.01 |

As shown in Table 1 above, the fuel efficiency of the vehicle increased by 3.6% on average, and Nox was reduced.

Test 2

This test was conducted at Aju Motor College to measure fuel efficiency and exhaust of a vehicle including the thermally conductive ring according to the present invention and a vehicle excluding the thermally conductive ring.

Test equipment includes a chassis dynamometer and exhaust gravimetric analyzer. The test vehicle is Grandeur TG manufactured by Hyundai Motor Company (auto transmission equipped, gasoline engine 3,300 cc, year 2007 model, and 80,000 Km driven). The test was commenced on Nov. 25, 2008 and continued until Dec. 1, 2008, and the test driving was conducted for 500 km and 1,000 km.

The driving mode was based on the mode set by the United States by statistically extracting most average driving pattern out of downtown driving patterns as shown in FIG. 21.

TABLE 2

| Mounting/unmounting | | Measured item | | | |
| --- | --- | --- | --- | --- | --- |
| | | Exhaust (g/km) | | | Fuel efficiency |
| | | HC | CO | Nox | (km/L) |
| Before mounting thermally conductive ring | #1 | 0.016 | 1.356 | 0.007 | 8.543 |
| | #2 | 0.013 | 1.706 | 0.008 | 8.429 |
| | #3 | 0.013 | 1.554 | 0.009 | 8.617 |
| | average | 0.014 | 1.54 | 0.008 | 8.53 |
| After mounting thermally conductive ring (500 km driven) | #1 | 0.011 | 0.639 | 0.005 | 8.735 |
| | #2 | 0.018 | 1.582 | 0.005 | 8.735 |
| | #3 | 0.012 | 0.489 | 0.007 | 8.709 |
| | average | 0.014 | 0.90 | 0.006 | 8.73(2.3%) |
| After mounting thermally conductive ring (1,000 km driven) | #1 | 0.004 | 0.260 | 0.007 | 8.863 |
| | #2 | 0.011 | 1.428 | 0.006 | 8.906 |
| | #3 | 0.012 | 1.008 | 0.009 | 8.909 |
| | average | 0.009 | 0.90 | 0.007 | 8.89(4.2%) |

As shown in Table 2 above, fuel efficiency of the vehicle increase by 2.3% to 4.2% on average and HC, CO and Nox were reduced.

As shown in the foregoing tests, the thermally conductive ring for a wheel assembly according to the present invention is installed between the stud bolt and the internal circumference of the fixing hole of the wheel to reduce a gap theretween and maintains a center of the wheel with respect to the axle. In particular, the thermally conductive ring promptly transfers heat generated during driving and braking from the brake pad and drum or disc to the tire wheel through the stud bolt to thereby maintain the thermal parallel within short time discharge heat to the outside.

Such discharge of heat may prevent deformation of the wheel assembly by variation of thermal expansion. This may prevent uneven wear and one side brake of a tire, increase in tire slip and shake while driving a corner which may arise from distortion or deformation of the tire wheel and axle.

As described above, the center ring and the thermally conductive ring for a assembly using the same according to the present invention may reduce the gap between the wheel and the stud bolt of large trucks, buses, passenger cars, RV vehicles and small trucks to which relatively large axial load applies to ensure correction of a center of the tire wheel, discharge heat generated during braking within short time and prevent distortion due to variation of thermal expansion among parts.

Test 3

This test was conducted to compare the grounding force of a vehicle including the thermally conductive ring according to the present invention and a vehicle excluding the thermally conductive ring when the vehicles pass a speed bump.

Regarding the vehicle used for this test, total weight was 2,095.5 kg, left and right loads from a front wheel were 558 kg and 522.5 kg, respectively, left and right load from a rear wheel were 486 kg and 530 kg, respectively, and right unsprung mass was 68.5 kg, sprung mass was 454 kg from the front wheel, and rear unsprung mass was 120 kg, and sprung mass was 410 kg from the rear wheel (SsangYong Motor Model 290SR, manufactured in 1999, ABS equipped).

Acceleration sensors were installed in unsprung and sprung parts for this test. A sensor was installed in a center of a body to measure acceleration from up and down and back and forth of the acceleration sensor.

While the sensor is installed in the vehicle, the vehicle passed the speed bump (height: 105 mm, width: 1,500 mm and length: 6 m) at the speed of 20 km/h and 50 km/h to test the grounding force of the front wheel and the rear wheel.

Figure 22:
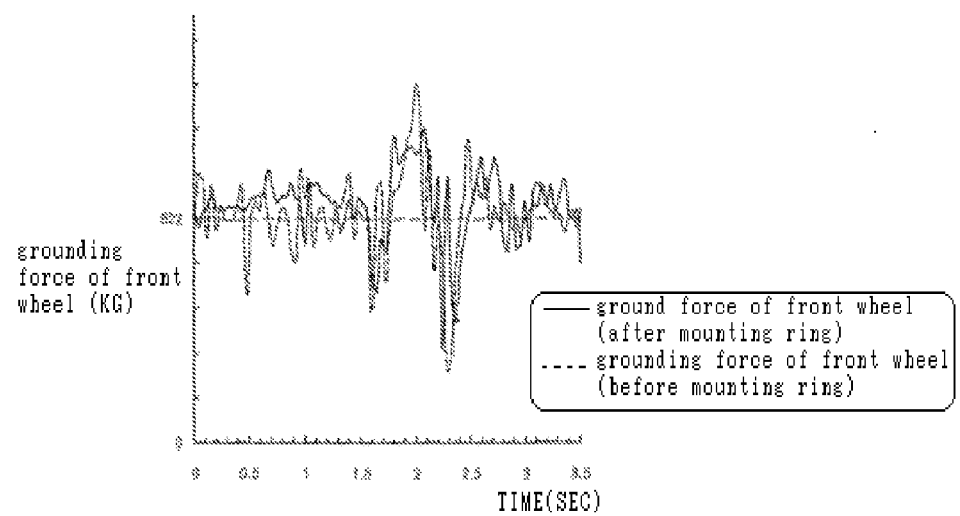
FIGS. 22 and 23 are graphs which compare grounding force of a vehicle including a thermally conductive ring inserted into a stud bolt and a vehicle excluding the thermally conductive ring when the vehicles pass a speed bump.
Figure 23:
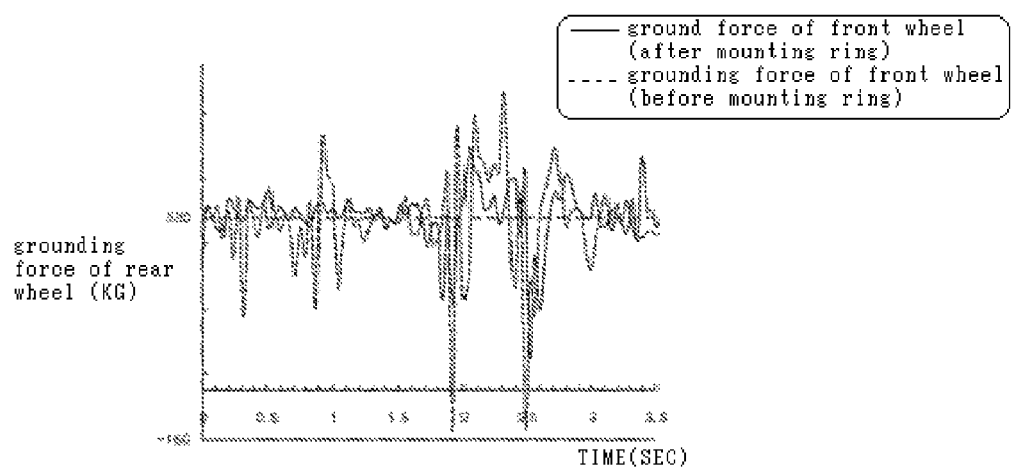
Figure 24:
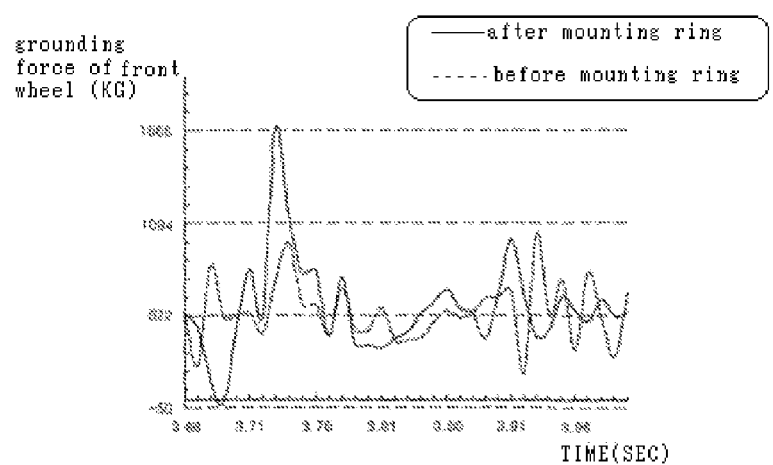
FIGS. 24 and 25 are graphs which compare grounding force of a vehicle including a thermally conductive ring inserted into a stud bolt and a vehicle excluding the thermally conductive ring when the vehicles pass a speed bump.

As shown in FIGS. 22 and 23, when the vehicle passes the speed bump at the speed of 20 km/h, the vehicle having the thermally conductive ring mounted in the stud bolt has smaller change in the grounding force of front and rear wheels. In particular, the rear wheel represents greater effect of mounting the thermally conductive ring than the front wheel.

Figure 25:
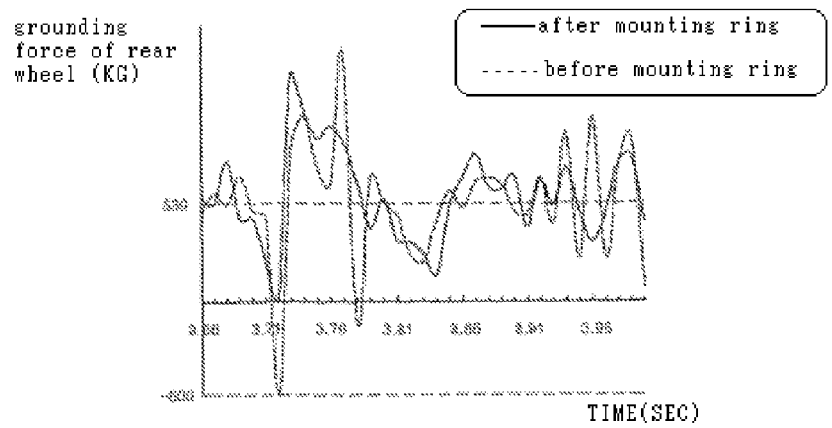

If a vehicle passes the speed bump at the speed of 50 km/h, the grounding force of the front wheel shows little variation when the thermally conductive ring is mounted/not mounted in the stud bolt. As shown in FIG. 25, however, the rear wheel shows relatively greater grounding force.

Test 4

The vehicle for the same test as referred to in test 3 was used to measure acceleration in a vertical direction from right front and rear wheels when the vehicle passes at the speed of 40 km/h road markers having a height of 20 mm and width 100 mm and arranged at a pitch of 300 mm. The measurement result is as shown in FIGS. 26 and 27.

Figure 26:
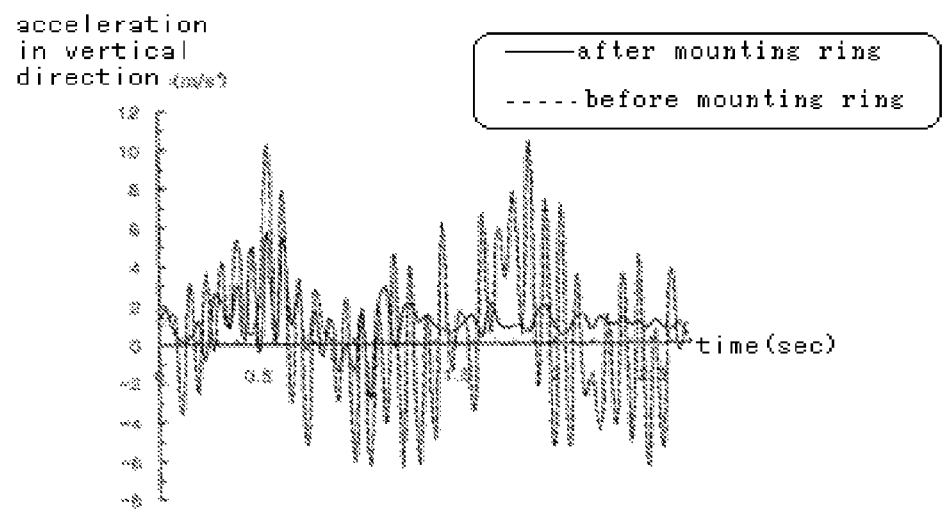
FIGS. 26 and 27 are graphs which compare acceleration in a vertical direction of a vehicle including a thermally conductive ring inserted into a stud bolt and a vehicle excluding the thermally conductive ring when the vehicles pass a road marker.
Figure 27:
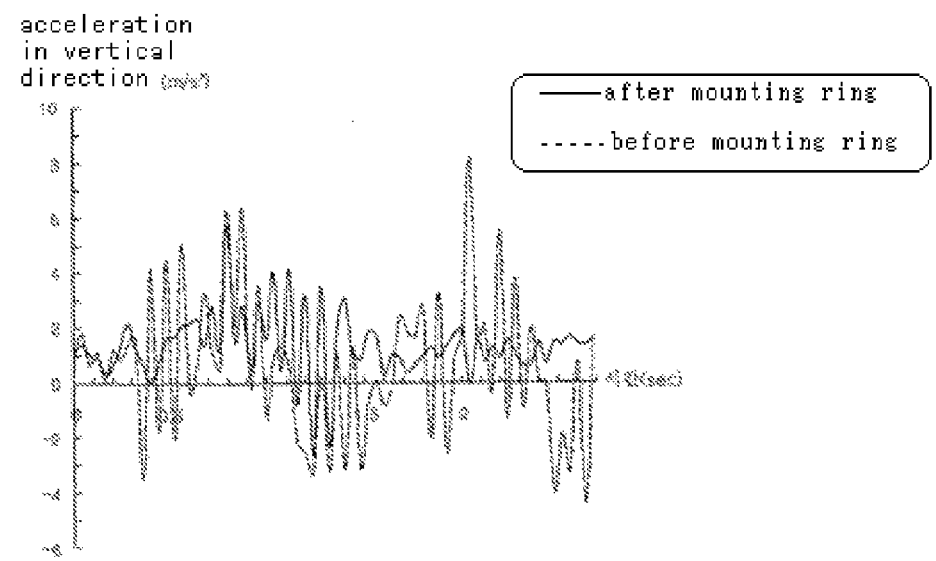
Figure 28:
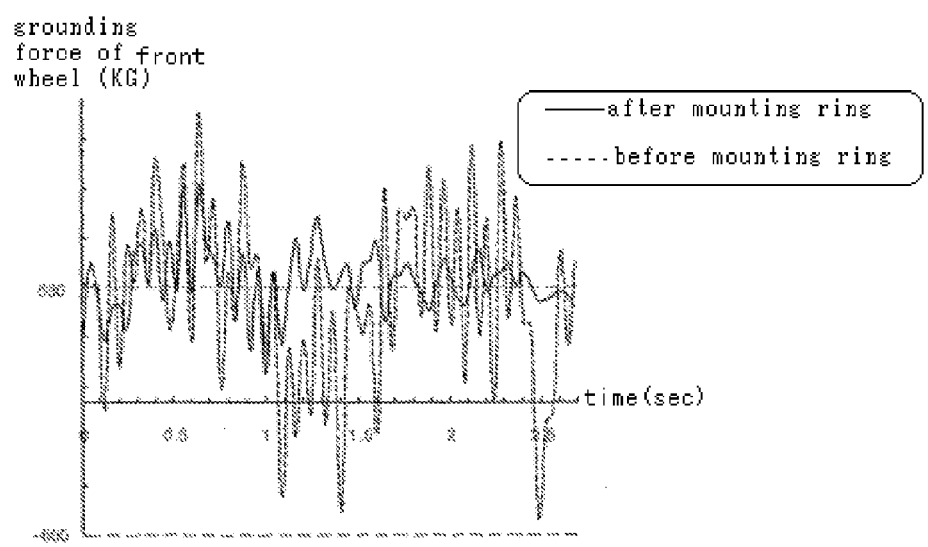
FIGS. 28 and 29 are graphs which compare grounding force of a vehicle including a thermally conductive ring inserted into a stud bolt and a vehicle excluding the thermally conductive ring when the vehicles pass a road marker.
Figure 29:
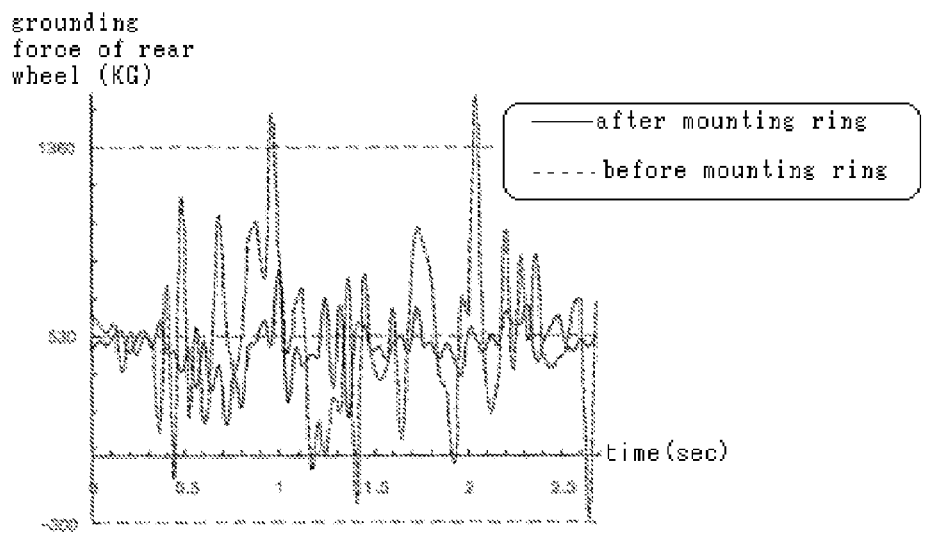

Referring to the graphs in FIGS. 26 and 27, a vibration was relatively reduced from the front and rear wheels when the thermally conductive ring is mounted in the stud bolt in the front and rear wheels. As shown in FIGS. 28 and 29, the variation of the grounding force of the front and rear wheels is reduced, and the grounding force sharply improved.

Test 5

Figure 30:
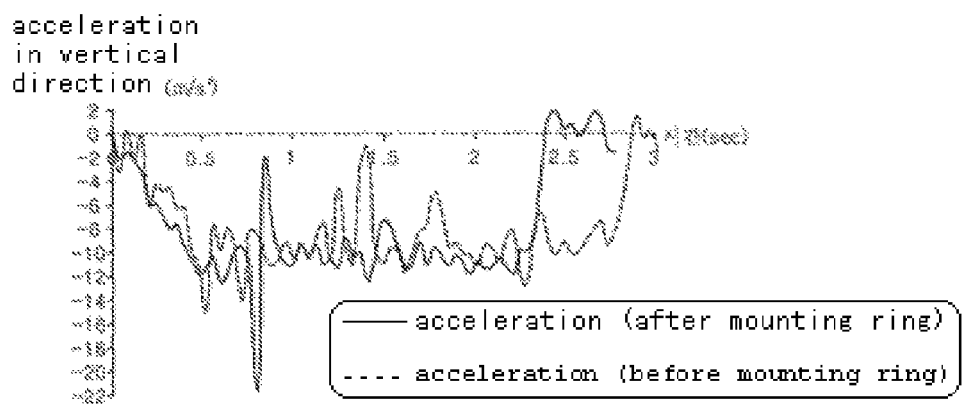
FIG. 30 is a graph which compares acceleration in a vertical direction of a vehicle including a thermally conductive ring inserted into a stud bolt and a vehicle excluding the thermally conductive ring when the vehicles are braked suddenly.

The vehicle for the same test as referred to in test 3 was used to measure an output signal of an acceleration sensor installed in a vertical direction of the vehicle when the vehicle is braked suddenly while driving on an asphalt road at the speed of 80 km/h. The measurement result is as shown in FIG. 30.

Referring to the graphs, the acceleration signal before the thermally conductive ring is mounted will be analyzed. The vibration of the acceleration value at an initial phase of the braking is deemed to have been caused by the variation of coefficient of friction of the disc and pad. The vibration of the acceleration signal in around 1 g(g: acceleration of gravity (9.8 m/s)) is caused by the ABS as a result of a slip between the wheel and a road surface due to braking.

Regarding an acceleration signal after the thermally conductive ring is mounted, the acceleration sharply changes compared to the case when the thermally conductive ring is not mounted. This may be a greater braking effect than the thermally conductive ring is not mounted. In around 1 g, the braking effect is greater in the vehicle including the thermally conductive ring than the vehicle excluding the thermally conductive ring. In particular, the maximum acceleration was 1.45 g before the thermally conductive ring was mounted. However, the maximum acceleration exceeds 2 g after the thermally conductive ring was mounted. The timing at which the acceleration signal meets the time axis again is faster when the thermally conductive ring is mounted. Based on such result, the braking distance may be reduced after the thermally conductive ring is mounted.

Figure 31:
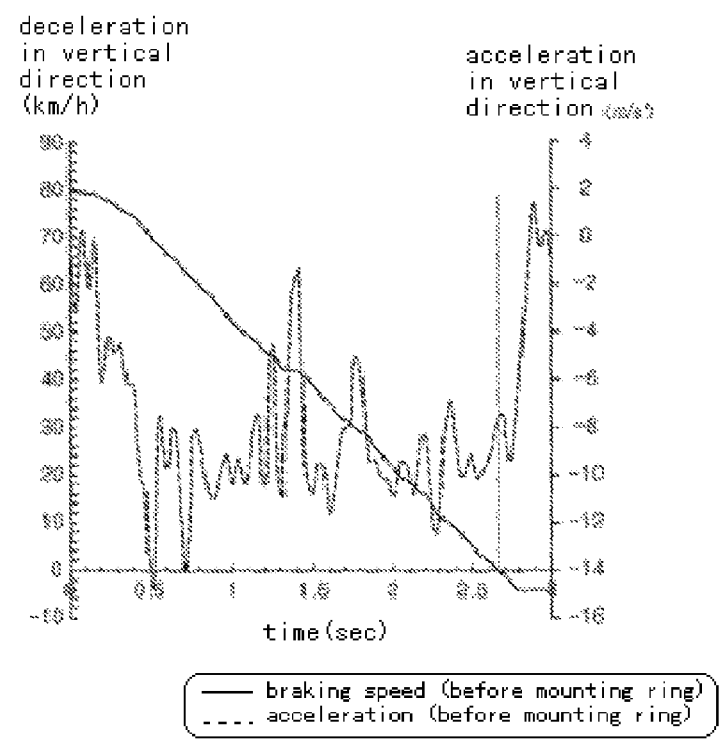
FIG. 31 is a graph which compares acceleration and speed in a vertical direction of a vehicle excluding the thermally conductive ring inserted into the stud bolt when the vehicle is braked suddenly.
Figure 32:
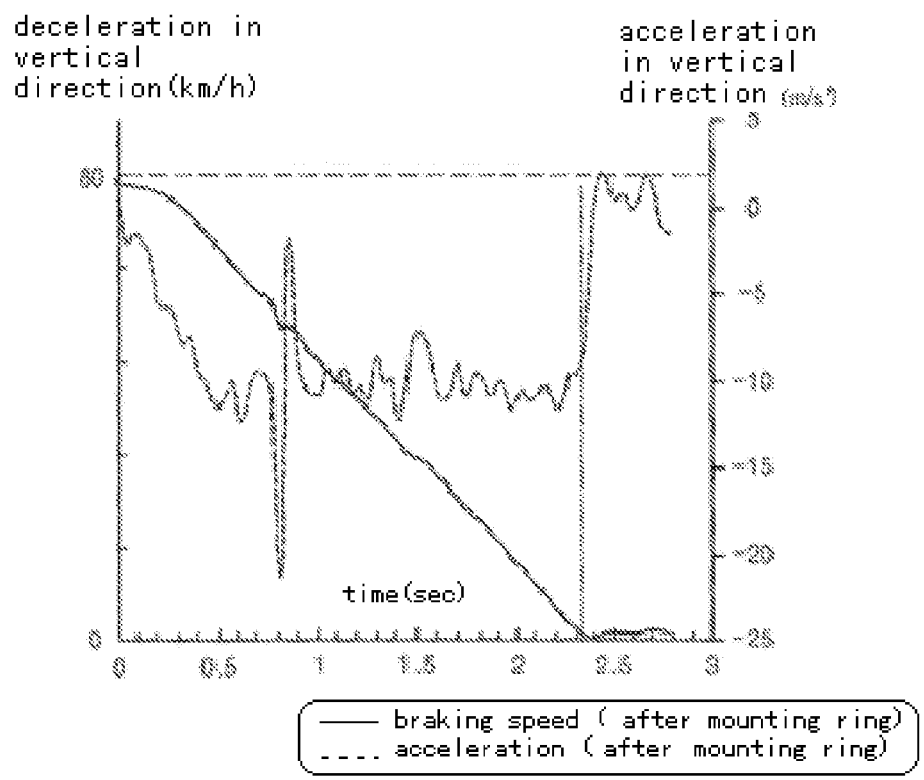
FIG. 32 is a graph which compares acceleration and speed in a vertical direction of a vehicle including the thermally conductive ring inserted into the stud bolt when the vehicle is braked suddenly.
Figure 33:
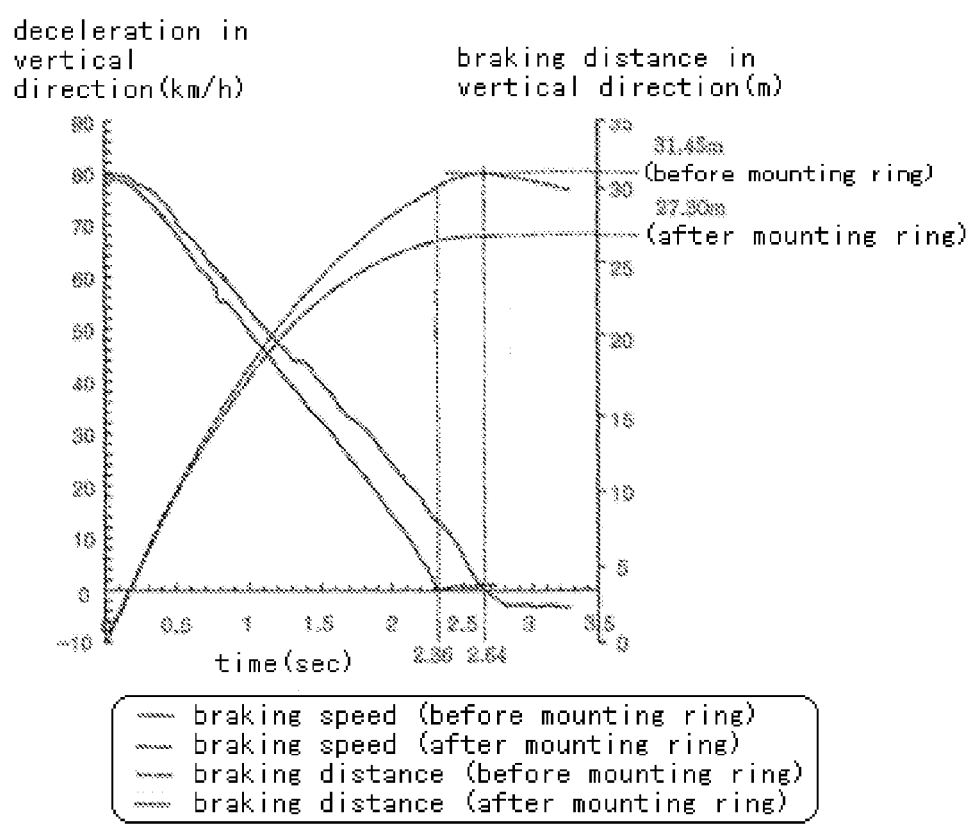
FIG. 33 is a graph which compares speed in a vertical direction and a braking distance of a vehicle including the thermally conductive ring inserted into the stud bolt and a vehicle excluding the thermally conductive ring when the vehicles are braked suddenly.

FIGS. 31, 32 and 33 show an acceleration in a vertical direction and a speed in a vertical direction presumed from the acceleration in the vertical direction when a sudden braking is made before and after the thermally conductive ring is mounted in the stud bolt. Integral-calculus initial speed was 80 km. Integral calculus is made and the vehicle is deemed to have been suspended when the speed in the vertical direction is zero.

The time taken from the sudden braking to suspension was 2.64 seconds when the thermally conductive ring is mounted in the stud bolt. If the thermally conductive ring is mounted, the time taken from the sudden braking to suspension was 2.36 seconds. The acceleration signal value beyond the time axis after suspension was overshoot. This results from an elastic force of elastic members such as tires and springs of a vehicle.

Figure 34:
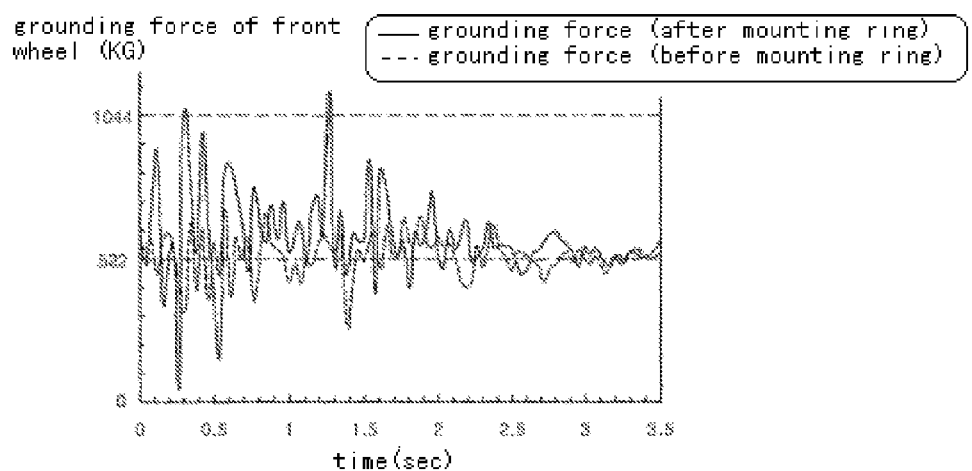
FIGS. 34 and 35 are graphs which compare the grounding force of a vehicle including the thermally conductive ring inserted into the stud bolt and a vehicle excluding the thermally conductive ring when the vehicles are braked suddenly.

If the speed in the vertical direction at the time of sudden braking is compared as in FIG. 33, the speed in the vertical direction is more fastly reduced when the thermally conductive ring is mounted than when the thermally conductive ring is not mounted. If the thermally conductive ring is mounted as in FIG. 34, the grounding force is more adjacent to the passive corner weight. The change in the grounding force of the front wheel is reduced when the thermally conductive ring is mounted. This may show that the grounding force during braking is greater when the thermally conductive ring is mounted than it is not mounted.

The improvement of the grounding force after the thermally conductive ring is mounted contributed to the shortening of the braking distance. If the thermally conductive ring is mounted, the grounding force of the front wheel exceeds the passive corner weight in 2.36 seconds.

Figure 35:
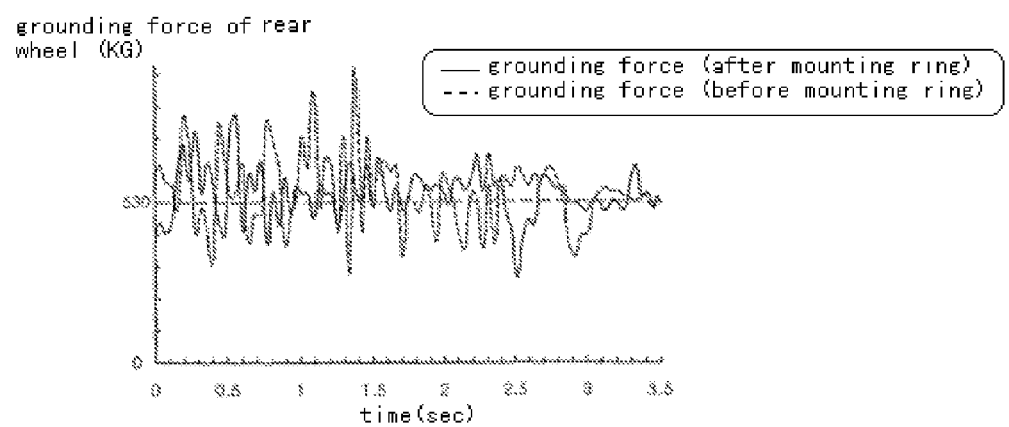

FIG. 35 illustrates the grounding force of the rear wheel during sudden braking when the thermally conductive ring is mounted. In this case, the grounding force is more adjacent to the passive corner weight. The change of the grounding force after the thermally conductive ring is mounted is reduced. This shows that the grounding force is greater during braking when the thermally conductive ring is mounted than the thermally conductive ring is not mounted. The improvement of the grounding force after the thermally conductive ring is mounted contributed to the shortening of the braking distance.

The grounding force of the rear wheel during braking is sharply reduced in 2.36 seconds after the thermally conductive ring is mounted. At such time, the load of the rear wheel is moved to the front wheel.

Although a few exemplary embodiments have been shown and described, it will be appreciated by those skilled in the art that changes may be made in these exemplary embodiments without departing from the principles and spirit of the invention, the range of which is defined in the appended claims and their equivalents.

The true protection scope of the present invention will be defined by the claims herein.

INDUSTRIAL APPLICABILITY

The thermally conductive ring for a wheel assembly according to the present invention may be provided between a stud bolt and a fixing hole of the wheel of a vehicle to improve driving performance of the vehicle.

The invention claimed is:

1. A thermally conductive ring for a wheel assembly which is inserted into a stud bolt fixing a brake drum or disc to a wheel, the thermally conductive ring comprising:
   a main body which is shaped like a cylinder and includes a cutaway portion in a lengthwise direction; and
   a heat-dissipating portion which is formed in at least one side of a surface and edge of the main body and increases the surface area,
   wherein the main body comprises a base metal member which is shaped like a cylinder and comprises the cutaway portion, a first thermally conductive layer formed on a surface of the base metal member and a second thermally conductive layer coating a surface of the first thermally conductive layer.

2. The thermally conductive ring according to claim 1, wherein the heat-dissipating portion comprises projections shaped like a saw tooth, circle or wave formed continuously or uncontinuously in an edge of the main body.

3. The thermally conductive ring according to claim 1, wherein an intermediate layer is formed between the first and second thermally conductive layers.

4. A thermally conductive ring for a wheel assembly which is inserted into a stud bolt fixing a brake drum or disc to a wheel, the thermally conductive ring comprising:
   a main body which is shaped like a cylinder and includes a cutaway portion in a lengthwise direction; and
   a heat-dissipating portion which is formed in at least one side of a surface and edge of the main body and increases the surface area,
   wherein the main body further comprises a base metal member and an auxiliary thermal expansion layer which is coupled to the base metal member and reduces a gap between the stud bolt and the fixing hole of the wheel by the thermal expansion and comprises a larger thermal expansion coefficient than the base metal member.

5. The thermally conductive ring according to claim 4, wherein the base metal member comprises STC steel, the first thermally conductive layer comprises copper or copper alloy, the intermediate layer comprises nickel and the second thermally conductive layer comprises one of gold, titanium, gold alloy, titanium alloy, chrome and chrome alloy.

* * * * *